D. J. ANGUS.
VOLT AMPERE METER.
APPLICATION FILED AUG. 25, 1919.
1,342,082.
Patented June 1, 1920.
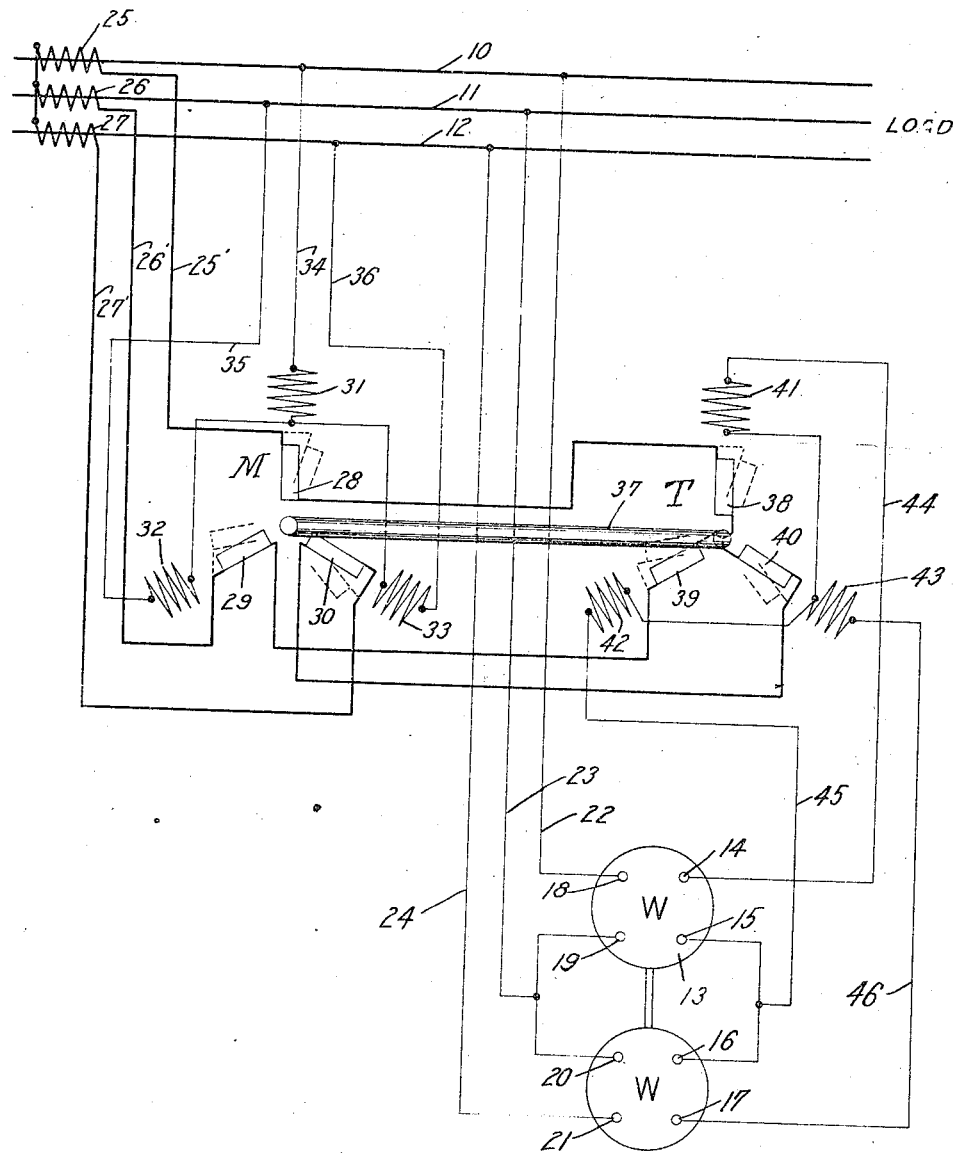
Inventor
DONALD J. ANGUS
By Hood & Ashley
Attorneys

UNITED STATES PATENT OFFICE.

DONALD J. ANGUS, OF INDIANAPOLIS, INDIANA.

VOLT-AMPERE METER.

1,342,082.  Specification of Letters Patent.  Patented June 1, 1920.

Application filed August 25, 1919. Serial No. 319,766.

*To all whom it may concern:*

Be it known that I, DONALD J. ANGUS, a citizen of the United States, residing at Indianapolis, in the county of Marion and State of Indiana, have invented a new and useful Volt-Ampere Meter, of which the following is a specification.

It is the object of my invention to measure the product of the current and the voltage in alternating current circuits regardless of the phase displacement of the current from the voltage. In other words, the object is to give a true volt-ampere measurement regardless of power factor.

In particular, it is the object of the present invention to produce a phase shift of the current supplied to the current winding of the measuring watt-meter from the current in the circuit in which the volt-ampere consumption is to be measured in the opposite direction and by an amount equal to any phase shift which the current in such circuit may make with respect to the voltage to said circuit, to maintain a definite phase relationship between the current supplied to and the voltage impressed on the watt-meter and thus maintain a constant power factor in the watt-meter.

In accomplishing this result I supply the current winding of the watt-meter through a transformer having a rotating magnetic field, of which transformer at least the primary has a polyphase winding and the primary and secondary are relatively mechanically rotatable to vary the phase relationship between the circuits thereof; and I provide means responsive to phase shift of the current in relation to the voltage of the main circuit, and by such means control the relative mechanical positions of the primary and secondary of said transformer, to produce a phase shift in the secondary of said transformer equal and opposite to any phase shift which occurs in the current in said main circuit.

The accompanying drawing illustrates my invention in a system in which the rotating field transformer has one of its members mechanically operated by being directly connected to a motor device the position of which is a function of the phase relationship between the voltage and the current in the main circuit. In such drawing the single figure is a semi-diagrammatic view showing the essential elements of that form of my invention, and their electrical connections.

The three-phase circuits 10—11—12 is the one of which the volt-ampere consumption is to be measured. The meter 13 may be any standard watt-meter, having terminals 14, 15, 16 and 17 for its current coils and terminals 18, 19, 20, and 21 for its voltage coils. The voltage-coil terminals are connected by wires 22, 23, and 24 across the main circuit, though of course any suitable transformer may be provided in this connection. Thus the voltage impressed on the voltage coils has a definite phase relationship to the voltage of the main circuit. The current-coil terminals of the watt meter, however, are connected to the main circuit through my apparatus, whereby the current supplied to the watt meter may be maintained in definite phase relationship to the voltage impressed on the watt meter, as will be clear.

To this end, in the system shown, the usual current transformers 25, 26, and 27, which are suitably connected in the main circuit, are connected by wires 25', 26', and 27' to the exciting coils 28, 29, and 30 of one element, here shown as the movable element, of a motor device M, so that a rotating magnetic field in definite phase relationship with the current in the main circuit is produced in such element. The other element, in this case the stationary element, of such motor device is provided with three exciting coils 31, 32, and 33, which are connected by wires 34, 35, and 36 across the main circuit 10—11—12 so that there is produced in this element of the motor device a rotating magnetic field in definite phase relationship with the voltage of the main circuit. The connections are such that the two magnetic fields rotate in the same direction. The movable element of the motor device is free to rotate, and it tends to take a position so that its rotating magnetic field is exactly in spatial phase with the rotating magnetic field in the other element. In case of a phase shift of the current relative to the voltage in the main circuit, whether by lag or lead, the current-produced field in the motor device M correspondingly lags or leads; and in consequence the movable element of the motor device, since it is here the one which has such current-produced fields, moves in the opposite direction to that in which the phase shift of such current-produced field has occurred, and by the same amount, to maintain at all times the coincidence of and the no-torque relation between the current-produced field and the voltage-produced field—that is, the mechanical movement of the movable element of the motor device is always such as to maintain the two rotating magnetic fields in spatial phase with each other. This same result is obtained if there is only one rotating magnetic field in this motor device, and the other magnetic field is a mere alternating field produced by a single phase. In other words, for instance, the coils 32 and 33 or the coils 29 and 30, may be omitted, and the action will be the same.

The movable element of the motor device M is connected by a shaft 37 to the movable element of a rotating-field transformer T, which controls the phase position of the current supplied to the watt meter 13. The two elements of the transformer are relatively mechanically rotatable. The rotating element of this transformer may be either the primary or the secondary, but as shown is the primary. The primary winding is a polyphase winding, and comprises three coils 38, 39, and 40, which as shown are connected in series with the coils 28, 29, and 30, so that like the latter coils they produce a rotating field in definite phase relationship with and proportional to the current in the main circuit 10—11—12. The secondary winding of the transformer T, as shown, is also a polyphase winding, though this is not essential, and comprises three coils 41, 42, and 43 in which currents are induced by the rotating field produced by the coils 38, 39, and 40. The secondary coils 41, 42, and 43 are connected by wires 44, 45, and 46 to the current terminals of the watt-meter 13, to supply to the current coils of the meter a current proportional to the current in the main circuit 10—11—12.

The phase relationship between the current supplied to the current windings of the watt meter and the current in the main circuit, however, may vary, depending upon the mechanical position of the transformer T; and this mechanical position depends upon the position of the motor device M. When by reason of a phase shift of the current in the main circuit in relation to the voltage thereof the movable element of the motor device M moves mechanically backward or forward in correspondence with such phase shift, it produces a corresponding mechanical movement of the movable element of the transformer T. This mechanical movement of the movable element of the transformer T produces a corresponding phase shift in the currents induced in the secondary coils 41, 42, 43; and thus a corresponding phase shift in the current supplied to the coils of the watt meter. This phase shift of the current supplied to the watt meter exactly corresponds in value to but is opposite in sense to the phase shift of the current in the main circuit, which latter phase shift caused the mechanical movements of the movable members of the motor device M and transformer T; so that the current supplied to the watt meter varies in lag or lead with respect to the current in the main circuit in exact correspondence with the way in which the current in the main circuit leads or lags with respect to the voltage of the main circuit. In other words, the current supplied to the watt meter is always maintained in a definite and unchangeable phase relationship both with the voltage of the main circuit and with the voltage impressed on the watt meter; so that the watt meter itself always operates at a constant power factor, and so gives a true indication of the product of the current and the voltage irrespective of the power factor of the circuit 10—11—12.

I have shown my invention with all the windings star connected and as applied only to a three-phase circuit. The invention, however, is not limited to star-connected windings, or to three-phase circuits, but is applicable to any kind of connections and to any kind of circuits whereby rotating magnetic fields are producible. I have also shown my invention with the transformer T mechanically operated by a motor device which is inherently responsive to variations in the phase relationship between the voltage and the current; but this direct operation of the transformer by such a motor device, though desirable, is not essential to my invention in its broader aspects.

I claim as my invention.

1. In combination, a meter having voltage and current windings, a transformer having relatively movable primary and secondary members of which at least the primary member is wound to produce a rotating magnetic field, the winding of the secondary member being connected to the current winding of said meter and the windings of the primary member being arranged for current connection to a polyphase circuit, and a motor device mechanically connected to said transformer and having two relatively movable members one of which is arranged to be excited in definite phase relationship with the primary of said transformer and the other of which is arranged to be excited in definite phase relationship with the voltage impressed upon the voltage of the meter.

2. In combination, a meter having voltage and current windings, a transformer having relatively movable primary and secondary members of which at least the primary member is wound to produce a rotating magnetic field, the winding of the secondary member being connected to the current winding of said meter and the windings of the primary member being arranged for current connection to a polyphase circuit, and a motor device mechanically connected to said transformer and having two relatively movable members one of which is arranged to be excited in definite phase relationship with the primary of said transformer and the other of which is arranged to be excited in definite phase relationship with the voltage impressed upon the voltage of the meter, the magnetic field produced by one of the members of said motor device being a rotating magnetic field.

3. In combination, a meter having voltage and current windings, a transformer having relatively movable primary and secondary members of which at least the primary member is wound to produce a rotating magnetic field, the winding of the secondary member being connected to the current winding of said meter and the windings of the primary member being arranged for current connection to a polyphase circuit, and means responsive to variations in the phase relationship between the current and the voltage in a polyphase circuit for producing relative mechanical movements between the primary and secondary members of said transformer in the proper direction and by the necessary distance to produce corresponding but opposite variations between the current supplied to the current winding of said meter and the current in said circuit.

4. In combination, a meter having voltage and current windings, a transformer having relatively movable primary and secondary members of which at least the primary member is wound to produce a rotating magnetic field, the winding of the secondary member being connected to the current winding of said meter and the windings of the primary member being arranged for current connection to a polyphase circuit, and means responsive to variations in the phase relationship between the current and the voltage in a polyphase circuit for producing relative mechanical movements between the primary and the secondary members of said transformer.

5. In combination, a rotating-field transformer having relatively movable primary and secondary windings at least the primary of which is wound to produce a rotating magnetic field, said primary winding being arranged to have current connections to a circuit in which the volt-ampere consumption is to be measured, a meter having voltage coils arranged to have voltage connections to said circuit and current coils connected to the secondary winding of said transformer, and a motor device mechanically connected to said transformer to control the relative positions of the primary and secondary windings thereof, said motor device being wound so that its position is controlled by the phase displacement of the current from the voltage in such circuit.

6. In combination, a rotating-field transformer having relatively movable primary and secondary windings at least the primary of which is wound to produce a rotating magnetic field, said primary winding being arranged to have current connections to a circuit in which the volt-ampere consumption is to be measured, a meter having voltage coils arranged to have voltage connections to said circuit and current coils connected to the secondary winding of said transformer, and a motor device having a movable member mechanically connected to the movable member of said transformer, the windings of said motor device being arranged so that the position of the movable member of said motor device is a function of the phase displacement of the current from the voltage in said circuit.

7. In combination, a rotating-field transformer having relatively movable primary and secondary windings at least the primary of which is wound to produce a rotating magnetic field, said primary winding being arranged to have current connections to a circuit in which the volt-ampere consumption is to be measured, a meter having voltage coils arranged to have voltage connections to said circuit and current coils connected to the secondary winding of said transformer, and means responsive to variations in the phase relationship between the current and the voltage in said circuit for producing relative mechanical movements between the primary and secondary windings of said transformer in the proper direction and by the necessary distance to produce corresponding but opposite variations between the current supplied to the current winding of said meter and the current in said circuit.

8. In combination, a rotating-field transformer having relatively movable primary and secondary windings at least the primary of which is wound to produce a rotating magnetic field, said primary winding being arranged to have current connections to a circuit in which the volt-ampere consumption is to be measured, a meter having voltage coils arranged to have voltage connections to said circuit and current coils connected to the secondary winding of said transformer, and means responsive to variations in the phase relationship between the current and the voltage in said circuit for producing relative mechanical movements between the primary and secondary windings of said transformer.

9. In combination, a meter having current and voltage windings, connections from such meter windings to a circuit in which the volt-ampere consumption is to be measured, a motor device having a movable member and provided with windings which cause said movable member to take a position which is a function of the phase displacement of the current from the voltage in said circuit, and means operated by the movable member of said motor device for producing a corresponding but opposite phase displacement from the current in said circuit of the current supplied to the current winding of said meter.

10. In combination, a meter having current and voltage windings, connections from such meter windings to a circuit in which the volt-ampere consumption is to be measured, a motor device having a movable member and provided with windings which cause said movable member to take a position which is a function of the phase displacement of the current from the voltage in said circuit, and means operated by the movable member of said motor device for producing in the current supplied to the current winding of said meter a phase displacement from the current in said circuit which is a function of the first-named phase displacement.

11. In combination, a meter having current and voltage windings, connections from such meter windings to a circuit in which the volt-ampere consumption is to be measured, a motor device having a movable member and provided with windings which cause said movable member to take a position which is a function of the phase displacement of the current from the voltage in said circuit, and a rotating field transformer having a movable member connected to the movable member of said motor device to take positions corresponding thereto, said transformer being connected in the connections between said circuit and the current winding of the meter so that the phase position of the current supplied to said current winding is controlled by the position of the movable member of said transformer.

12. In combination, a meter having current and voltage windings, connections from such meter windings to a circuit in which the volt-ampere consumption is to be measured, means controlled by the phase displacement of the current from the voltage in said circuit, and means controlled by said first-named means for producing a corresponding but opposite phase displacement from the current in said circuit of the current supplied to the current winding of said meter.

13. In combination, a meter having current and voltage windings, connections from such meter windings to a circuit in which the volt-ampere consumption is to be measured, means controlled by the phase displacement of the current from the voltage in said circuit, and means controlled by said first-named means for producing in the current supplied to the current winding of said meter a phase displacement from the current in said circuit which is a function of the first-named phase displacement.

14. In combination, a meter having current and voltage windings, connections from such meter windings to a circuit in which the volt-ampere consumption is to be measured, and means controlled by the phase shift of the current from the voltage in said circuit for producing a corresponding but opposite phase shift from the current in said circuit of the current supplied to the current winding of said meter.

15. The method of maintaining constant power factor in an alternating-current watt meter, which consists in exciting the voltage winding of said watt meter in proportion to and in definite phase relationship with the voltage of the circuit in which the volt-ampere consumption is to be measured, exciting the current winding of said meter in proportion to the current in said circuit, and producing phase shifts of the current supplied to the current winding of said meter from the current in said circuit by amounts equal and opposite to phase shifts which occur in said circuit in relation to the voltage of said circuit.

16. The method of operating an alternating-current watt-meter, which consists in impressing on its voltage windings a voltage proportional to the voltage of an alternating-current circuit, supplying to the current winding of said meter a current proportional to the current in said circuit, and shifting the phase position of the current supplied to the current winding of said meter with respect to the current in said circuit oppositely to any phase shifts which occur in the current in said circuit with respect to the voltage of said circuit.

17. In combination, a rotating field transformer having relatively movable primary and secondary members, at least the primary member of said transformer being wound to produce a rotating magnetic field, the primary winding of said transformer being connected so that it is excited in proportion to and in definite phase relationship with the current in an alternating-current circuit, and a motor device mechanically connected to said transformer to control the relative positions of the primary and secondary members thereof, said motor device being wound so that its position is controlled by the phase displacement of the current from the voltage in said circuit.

18. In combination, a rotating field transformer having relatively movable primary and secondary members, at least the primary member of said transformer being wound to produce a rotating magnetic field, the primary winding of said transformer being connected so that it is excited in proportion to and in definite phase relationship with the current in an alternating-current circuit, and a motor device mechanically connected to said transformer to control the relative positions of the primary and secondary members thereof, said motor device having two relatively mechanically movable members which are excited in definite phase relationship to the voltage and to the current respectively of said circuit.

19. In combination, a rotating field transformer having relatively movable primary and secondary members, at least the primary member of said transformer being wound to produce a rotating magnetic field, the primary winding of said transformer being connected so that it is excited in proportion to and in definite phase relationship with the current in an alternating-current circuit, and a motor device having a movable member mechanically connected to the movable member of said transformer, the windings of said motor device being arranged so that the position of the movable member thereof varies with phase shifts of the current from the voltage in said circuit in the proper direction and by the proper amount to produce a phase shift of the current in the secondary winding of said transformer to maintain the secondary current of said transformer in definite phase relationship with the voltage of said circuit.

20. In combination, a rotating field transformer having relatively movable primary and secondary members, at least the primary member of said transformer being wound to produce a rotating magnetic field, the primary winding of said transformer being connected so that it is excited in proportion to and in definite phase relationship with the current in an alternating-current circuit, and means responsive to phase shifts of the current from the voltage in said circuit for changing the relative positions of the primary and the secondary members of said transformer in the proper direction and by the proper amount to maintain the secondary current of said transformer always in a substantially definite relationship with the voltage of said circuit.

21. In combination, a rotating field transformer having relatively movable primary and secondary members, at least the primary member of said transformer being wound to produce a rotating magnetic field, the primary winding of said transformer being connected so that it is excited in proportion to and in definite phase relationship with the current in an alternating-current circuit, and means responsive to phase shifts of the current from the voltage in said circuit for changing the relative positions of the primary and the secondary members of said transformer.

22. In combination, a meter having voltage and current windings arranged for voltage and current connection respectively to a circuit in which the volt-ampere consumption is to be measured, a motor device also arranged to be connected to said circuit and having a movable member the position of which is controlled by the shifts of the current relative to the voltage in said circuit, and means operated by said motor device for producing in the current supplied to the current winding of said meter phase shifts corresponding to said first named phase shifts but in opposite directions.

23. In combination, a meter having voltage and current windings arranged for voltage and current connections respectively to a circuit in which the volt-ampere consumption is to be measured, a motor device also arranged to be connected to said circuit and having a movable member the position of which is controlled by the shifts of the current relative to the voltage in said circuit, and a rotating field transformer arranged in the connection from said circuit to the current winding of said meter and having its primary and secondary windings relatively mechanically movable by said motor device to produce in the current supplied to the current winding of the meter phase shifts corresponding to the first named phase shifts but in the opposite directions.

In witness whereof, I have hereunto set my hand at Indianapolis, Indiana, this eighth day of August, A. D. one thousand nine hundred and nineteen.

DONALD J. ANGUS.